(No Model.)

G. W. SCOVILL.
NOSE BAG.

No. 336,597. Patented Feb. 23, 1886.

Witnesses:
A. B. Battin
M. Price

Inventor:
George Washington Scovill
by Fred. Artos.
his Atty.

UNITED STATES PATENT OFFICE.

GEORGE WASHINGTON SCOVILL, OF CHICAGO, ILLINOIS, ASSIGNOR OF ONE-HALF TO JOSEPH JOHNSTON, OF SAME PLACE.

NOSE-BAG.

SPECIFICATION forming part of Letters Patent No. 336,597, dated February 23, 1886.

Application filed June 20, 1885. Serial No. 169,320. (No model.)

*To all whom it may concern:*

Be it known that I, GEORGE WASHINGTON SCOVILL, a citizen of the United States of America, residing at Chicago, in the county of Cook, State of Illinois, have invented new and useful Improvements in Nose-Bags for Animals, of which the following is a specification.

My invention relates to nose-bags in which the food is deposited in a receptacle and permitted to pass from the same into a partially-perforated food-box provided with a device for gradually delivering the supply for feeding the animal, to prevent accidental loss or waste and supply the animal with food free of impurities.

Figure 1:
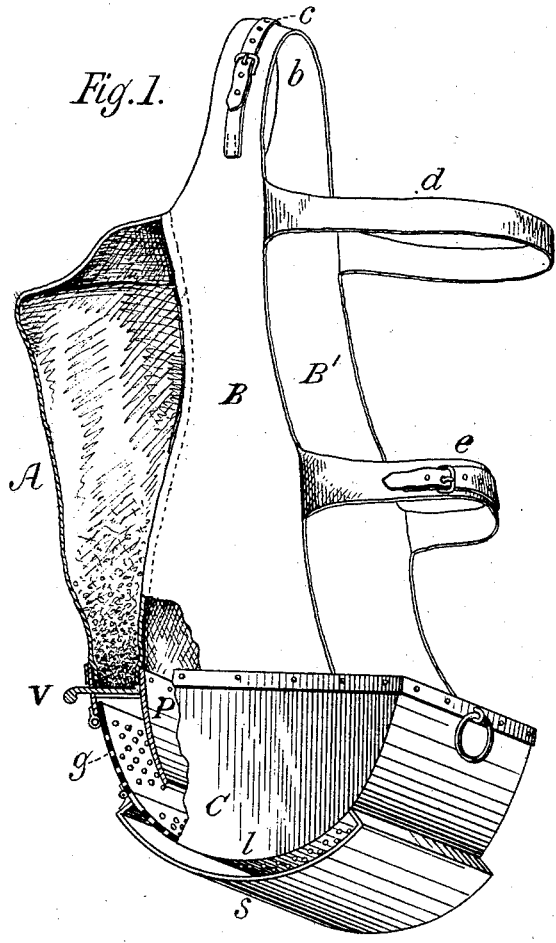
Figure 2:
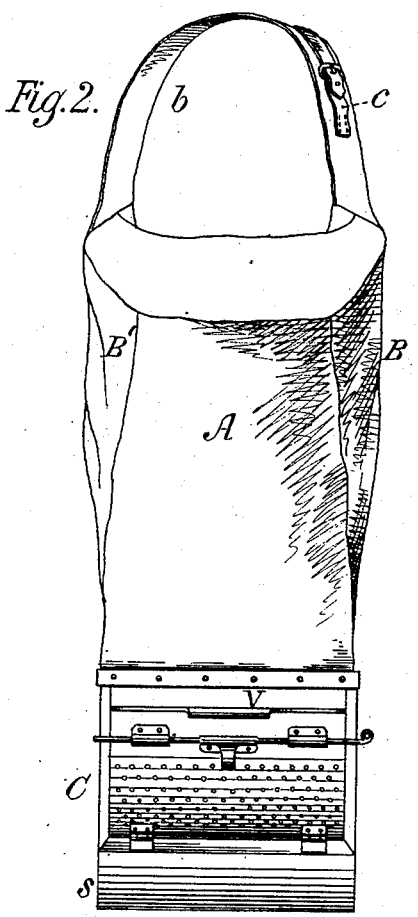
Figure 4:
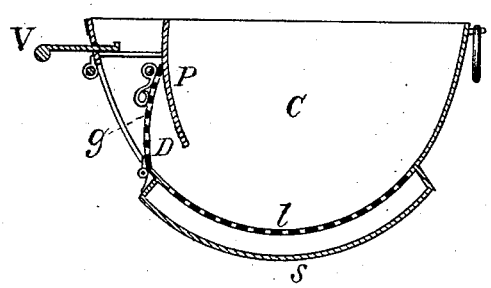
Figure 3:
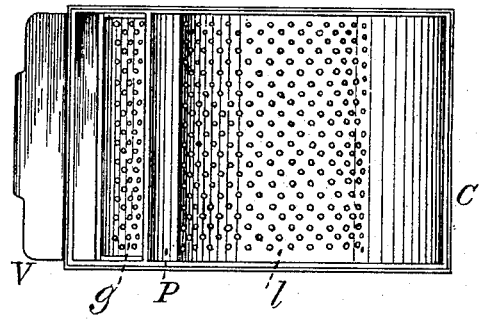

Referring to the accompanying drawings, Figure 1 is a perspective view of the feeding device, consisting of a feed bag or receptacle and food-box, a portion of the latter being in section to exhibit the interior arrangements. Fig. 2 is a rear end view of the same. Fig. 3 is a top view of the food-box, the sliding valve for admitting the food being partially drawn out; and Fig. 4 is a longitudinal section of the food-box with the receptacle removed.

The device is composed of a food-holding receptacle or bag, A, provided with cheek-covers or side straps, B B', and a food-box, C. The food-holding bag or receptacle A is made of some pliable material—such as is commonly used in nose-bags—and is of moderate size, and shaped to fit easily in the space underneath and between the neck and head of a horse, and is closed on its upper end and open at its lower one. In case of an opening at the upper end of the bag shall be preferred for supplying the same with food, it is provided with an overlapping cover or flap, to prevent the food contained therein from being spoiled. The lower end of the receptacle is properly secured to the rear part of the food-box, into which the contents of the box are permitted to pass by a slide-valve. The cheek-covers or side straps, B B', are part of the receptacle or bag A, extending from the same on both sides, and are at their lower portion secured to the top frame or rim of the food-box C, reaching about the middle of the same, to keep the box in an elevated position when used. The upper portions of the cheek-covers gradually decrease in width to the limit of a band or strap, b, projecting above the top end of the receptacle, and formed, after the ends are united, into a loop, b, to be slung over a horse's head. The upper part of said loop is mounted with a strap, c, and a buckle for adjusting the length of the cheek-covers B B', to enable the animal to reach the food at the bottom of the food-box. The said covers are also furnished in front with a head-band, d, and nose-strap e, for fitting the receptacle properly to the horse's head, by which arrangement the front of the same is in exposed position, purposely for the free breathing of the animal and ventilation of the food.

The food box or trough C is made of proper material, and is in longitudinal view of semi-circular form, having a perforated curved bottom, l, and its quadrangular open top part is in connection with the corresponding opening at the lower end of the feed bag or receptacle and with the cheek-covers B B'. The interior of the said box is divided transversely by a curved partition-plate, P, which guides the food from the receptacle into the same, and descends from the top part of the food-box, near the rear end of the same, with a slight inclination in its course toward the curved bottom of the food-box, and terminates a short distance from the same, forming an internal channel, D, open at both ends, to communicate with the food box or trough and with the receptacle or feed-bag, whereby the food contained in the same is permitted to pass into the trough by reason of its weight or gravity, but is intercepted by a sliding valve, V, located in the upper part of the channel D, underneath the open end of the feed-bag, for the purpose of regulating the quantity of food fed to the animal. Beneath the said valve V is a movable gate, g, consisting of a perforated plate hinged at its lower end to the curved bottom l of the trough C, representing in closed position a continuation of the same, and opens with its top end inwardly toward the partition P, for the purpose of supplying the receptacle with food. This latter is accomplished by turning the feed box or trough C to an upright position, taking care to have the feed box or receptacle A hanging downward, and drawing the valve V wide open, exposing the opening which communicates with the receptacle. The quantity of food is poured into the said box or trough, which runs down the bag; after which performance the valve is closed and the contents in the receptacle checked from waste.

The center portion of the curved bottom $l$ of the food box or trough may be provided with perforations or with an inserted perforated plate, and is protected by an auxiliary cover or shield, $s$, at a small distance from the same, fastened endwise to the bottom, which arrangement induces a current of fresh air to pass sidewise through the open space between the perforated bottom $l$ and the cover $s$, to ventilate the food and prevent the animal from breathing the polluted evaporation from the ground. The impurities mingled with the food—such as chaff, sand, mud, &c.—are abstracted partially by passing the perforated plate of the gate, and the remainder which may be carried into the trough by dropping through the perforated portion of the curved bottom.

Having thus described my invention fully, I claim—

1. A nose-bag consisting of a flexible feed-holding receptacle, a feed box or trough provided with a slide-valve, and a perforated plate hinged to the bottom of the trough below the valve and between the feed-receptacle and the opening communicating with the feed box or trough, substantially as described.

2. A nose-bag or receptacle as described, combined with a feed-trough, C, and cheek-covers B B', as described, said trough provided with a shield or plate, $s$, partition P, gate $g$, and valve V, substantially as shown and described, and for the purpose set forth.

In testimony that I claim the foregoing as my own I have hereunto affixed my signature in the presence of two subscribing witnesses.

GEORGE WASHINGTON SCOVILL.

Witnesses:
 HIRAM G. BATES,
 E. A. TYLER.